US012180043B2

(12) United States Patent
Noguchi et al.

(10) Patent No.: US 12,180,043 B2
(45) Date of Patent: Dec. 31, 2024

(54) CRANE DEVICE, METHOD FOR DETERMINING NUMBER OF FALLS, AND COMPUTER READABLE NON-TRANSITORY RECORDING MEDIUM

(71) Applicant: TADANO LTD., Kagawa (JP)

(72) Inventors: Kazunari Noguchi, Kagawa (JP); Keisuke Tamaki, Kagawa (JP)

(73) Assignee: TADANO LTD., Kagawa (JP)

( * ) Notice: Subject to any disclaimer, the term of this patent is extended or adjusted under 35 U.S.C. 154(b) by 738 days.

(21) Appl. No.: 17/283,463

(22) PCT Filed: Oct. 21, 2019

(86) PCT No.: PCT/JP2019/041337
§ 371 (c)(1),
(2) Date: Apr. 7, 2021

(87) PCT Pub. No.: WO2020/085314
PCT Pub. Date: Apr. 30, 2020

(65) Prior Publication Data

US 2022/0009753 A1 Jan. 13, 2022

(30) Foreign Application Priority Data

Oct. 22, 2018 (JP) ................................ 2018-198454

(51) Int. Cl.
*B66C 23/88* (2006.01)
*B66C 13/00* (2006.01)

(52) U.S. Cl.
CPC .............. *B66C 23/88* (2013.01); *B66C 13/00* (2013.01)

(58) Field of Classification Search
CPC ....... B66C 23/88; B66C 23/905; B66C 13/46; B66C 13/00; B66C 13/18; B66D 3/043
See application file for complete search history.

(56) References Cited

U.S. PATENT DOCUMENTS

2019/0119080 A1* 4/2019 Fukumori ............ B66C 15/065

FOREIGN PATENT DOCUMENTS

| | | | |
|---|---|---|---|
| CN | 103395696 | A | 11/2013 |
| JP | 2923078 | B2 | 7/1999 |
| JP | 2009-107745 | A | 5/2009 |

OTHER PUBLICATIONS

JPH 04350097(A) Machine Translation (which is a machine translation for JP 2923078 B). (Year: 1992).*
JP 2009/107745A Machine Translation. (Year: 2009).*
CN 103395696A Machine Translation. (Year: 2013).*
(Continued)

*Primary Examiner* — Michael R Mansen
*Assistant Examiner* — Juan J Campos, Jr.
(74) *Attorney, Agent, or Firm* — Paratus Law Group, PLLC

(57) ABSTRACT

A crane device is capable of setting multiple types of number of rope falls between a tip of a boom and a hook block, and includes: a feed length detection unit that detects a feed length of a rope fed from a winch on which the rope is wound; a boom angle detection unit that detects a boom hoist angle; and a number-of-falls determination unit that calculates information for determining the suitability of the number of falls for the rope on the basis of the feed length, hoist angle, boom length of the boom in a state of hoisting a grounded load.

6 Claims, 4 Drawing Sheets

(56) References Cited

OTHER PUBLICATIONS

Jan. 21, 2020, International Search Report issued for related PCT application No. PCT/JP2019/041337.
Jan. 21, 2020, International Search Opinion issued for related PCT application No. PCT/JP2019/041337.
Jun. 20, 2022, European Search Report issued for related EP Application No. 19875505.0.

* cited by examiner

CRANE DEVICE, METHOD FOR DETERMINING NUMBER OF FALLS, AND COMPUTER READABLE NON-TRANSITORY RECORDING MEDIUM

CROSS REFERENCE TO PRIOR APPLICATION

This application is a National Stage Patent Application of PCT International Patent Application No. PCT/JP2019/041337 (filed on Oct. 21, 2019) under 35 U.S.C. § 371, which claims priority to Japanese Patent Application No. 2018-198454 (filed on Oct. 22, 2018), which are all hereby incorporated by reference in their entirety.

TECHNICAL FIELD

The present invention relates to a crane device, a method for determining the number of hooks, and a program capable of changing the number of falls for a rope between a tip of a boom and a hook block.

BACKGROUND ART

Conventionally, a crane device capable of changing the number of falls for a rope between a tip of a boom and a hook block has been known. The crane device is provided with an overload prevention device configured to restrict an operation of the crane device such that a load exceeding a rated load does not act on the tip of the boom. The overload prevention device calculates the rated load based on the number of falls set by the operator, and controls an operation of the crane device so as not to exceed the rated load.

In the crane device provided with the overload prevention device, when the number of falls for a rope set in the overload prevention device is larger than an actual number of falls of the rope, there is a possibility that the rope is damaged or broken because an operation of the crane device is not restricted by the overload prevention device even if a load larger than an actual rated load acts on the rope. In addition, when the number of falls for the rope in the overload prevention device is smaller than the actual number of falls of the rope in the crane device, an over-winding state is likely to occur during an operation of raising a hook block, so that there is a possibility that reverse winding of the rope occurs in a winch drum during an operation of lowering the hook block.

Therefore, in the crane device provided with the overload prevention device, it is considered to determine whether an actual number of falls of a rope and the number of falls for the rope set in an overload prevention device are the same (see, for example, Patent Literature 1).

CITATION LIST

Patent Literature

Patent Literature 1: JP 2009-107745 A

SUMMARY OF THE INVENTION

Problems to be Solved by the Invention

In the crane device disclosed in Patent Literature 1 or the like, a pair of limit switches are provided at a predetermined distance from each other in order to acquire the actual number of falls of the rope, and the number of falls of the rope is calculated based on an elapsed time from an operation of one limit switch to an operation of the other limit switch by a hook block. For this reason, a dedicated limit switch is required, so that the manufacturing cost of the crane device is likely to increase.

The purpose of the invention is to provide a crane device, a method for determining the number of falls, and a program with which, without increasing the number of parts, it is possible to determine whether the actual number of falls for a rope and the number of falls for the rope set by an operator are the same.

Solutions to Problems

The crane device according to the present invention is a crane device capable of setting multiple types of number of rope falls between a tip of a boom and a hook block, and includes: a feed length detection unit that detects a feed length of a rope fed from a winch on which the rope is wound; a boom angle detection unit that detects a boom hoist angle; and a number-of-falls determination unit that calculates information for determining the suitability of the number of falls for the rope on the basis of the feed length, hoist angle, boom length of the boom in a state of hoisting a grounded load.

A method for determining the number of falls according to the present invention is a method for determining the number of falls for the rope in a crane device, capable of setting multiple types of number of falls of the rope between a tip of a boom and a hook block, and includes: a step of acquiring a feed length of the rope fed from a winch on which the rope is wound; a step of acquiring a hoist angle of the boom; a step of acquiring a boom length of the boom; and a step of calculating information for determining suitability of the number of falls for the rope on the basis of the feed length, the hoist angle, the boom length in a state of hoisting a grounded load.

A program according to the present invention causes a computer of a crane device, capable of setting multiple types of number of falls of the rope between a tip of a boom and a hook block, to execute: a process of acquiring a feed length of the rope fed from a winch on which the rope is wound; a process of acquiring a hoist angle of the boom; a process of acquiring a boom length of the boom; and a process of calculating information for determining suitability of the number of falls for the rope on the basis of the feed length, the hoist angle, the boom length in a state of hoisting a grounded load.

Effects of the Invention

According to the present invention, it is possible to determine whether the actual number of falls of the rope and the number of falls for the rope stored in a number-of-falls storage unit are the same by a device provided in the conventional crane device without increasing the number of parts, and thus, it is possible to suppress an increase in manufacturing cost.

DESCRIPTION OF EMBODIMENTS

FIGS. 1 to 5 illustrate one embodiment of the present invention. In the present embodiment, the present invention is applied to a crane device 20 of a mobile crane 1.

Figure 1:
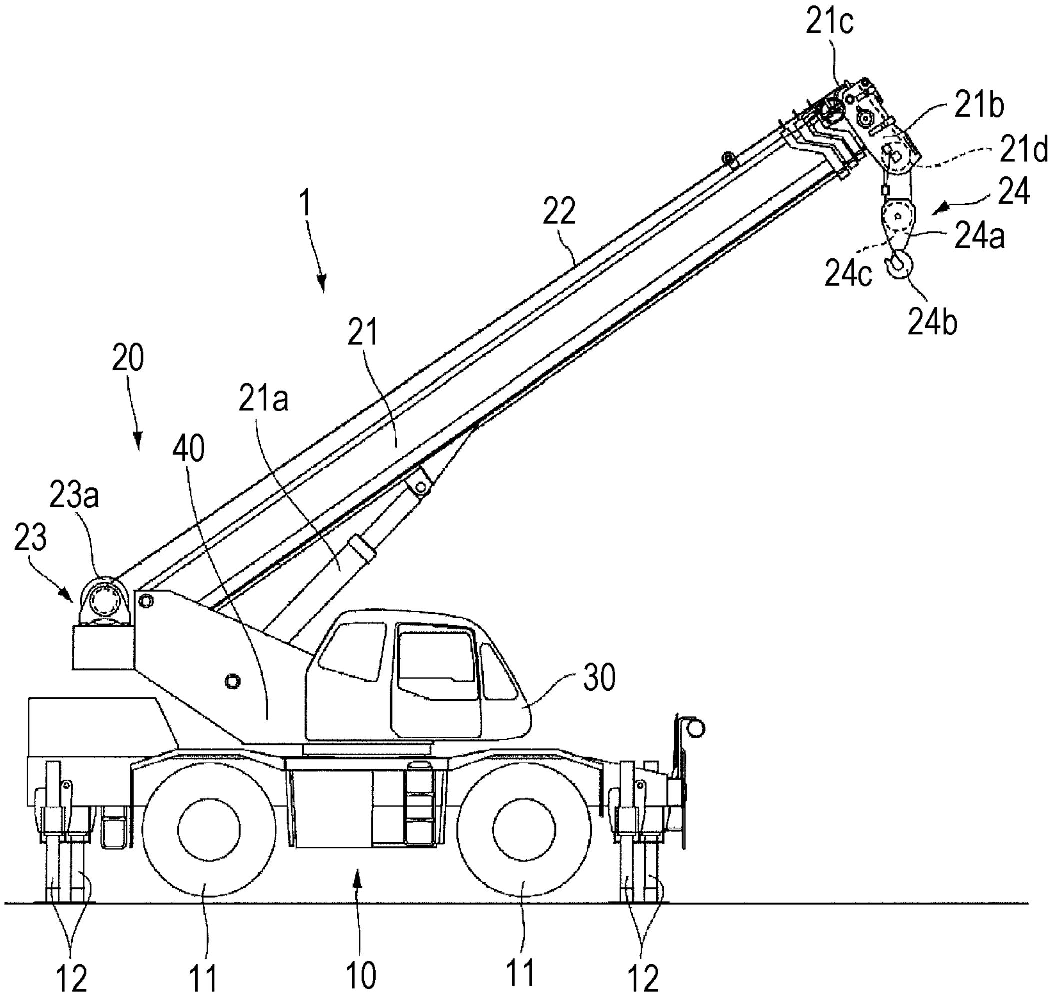
FIG. 1 is a side view of a mobile crane illustrating an embodiment of the present invention.

As illustrated in FIG. 1, the mobile crane 1 includes: a vehicle body 10 configured to travel on a general road or in a work area; a crane device 20 configured to perform crane work; and a cab 30 configured to operate the vehicle body 10 to travel and operate the crane work of the crane device 20. The crane device 20 and the cab 30 are supported by a turning base 40 that can turn in the horizontal direction with respect to the vehicle body 10, the crane device 20 is arranged on one side of the turning base 40 in the width direction, and the cab 30 is arranged on the other side in the width direction.

The vehicle body 10 includes wheels 11 provided on both sides in the width direction on the front side and the rear side, and outriggers 12 provided in front of the front-side wheels 11 and behind the rear-side wheels 11. The vehicle body 10 travels by a driving force of an engine.

The crane device 20 includes: a telescoping boom 21 configured to be raisable and elongatable/contractible with respect to the vehicle body 10; a rope 22 that extends along the telescoping boom 21 and hangs from a tip of the telescoping boom 21; a winch 23 winding and feeding the rope 22; and a hook block 24 that is locked to the rope 22 hanging from the tip of the telescoping boom 21.

The telescoping boom 21 is constituted by a plurality of boom members formed in a tubular shape, and has a telescopic elongation/contraction mechanism. The telescoping boom 21 performs an elongation/contraction operation by a hydraulic elongation/contraction cylinder (not illustrated). In addition, the telescoping boom 21 has a proximal end connected to the turning base 40 to be swingable in the vertical direction. A hydraulic raising cylinder 21*a* is connected between a substantially central portion of the telescoping boom 21 in the extending direction and the turning base 40, and the telescoping boom 21 performs a raising operation by an elongation/contraction operation of the raising cylinder 21*a*.

In addition, a boom head 21*b* is provided at the tip of the telescoping boom 21. A guide sheave 21*c* configured to guide the rope 22 extending along the upper surface of the telescoping boom 21 downward on the upper side of the boom head 21*b* in a state where the telescoping boom 21 is oriented in the horizontal direction. In addition, one or more top sheaves 21*d* configured to hang the rope 22 between the boom head 21*b* and the hook block 24 are arranged on the lower side of the boom head 21*b* with a rotation axis oriented in the width direction of the boom head 21*b*.

The rope 22 is a wire rope obtained by twisting a plurality of strands formed by twisting hard steel wires, or a synthetic fiber rope made of synthetic fibers.

The winch 23 is provided at a position adjacent to the proximal end of the telescoping boom 21 on the turning base 40. The winch 23 includes a winch drum 23*a* on which a rope 22 is wound, and a hydraulic winch motor (not illustrated) configured to rotate the winch drum 23*a*. A winding operation and a feeding operation of the rope 22 in the winch drum 23*a* can be switched by switching a driving direction of a rotation shaft of the winch motor.

The hook block 24 includes: a pair of side plates 24*a*; a hook 24*b* provided at the bottom of the pair of side plates 24*a*; and one or more hook sheaves 24*c* which are rotatably supported between the pair of side plates 24*a* via a support shaft.

The turning base 40 is rotatably provided with respect to the vehicle body 10 via a ball bearing type or roller bearing type turning circle, and turns by a hydraulic turning motor (not illustrated).

Here, actuators such as the telescopic cylinder, the raising cylinder 21*a*, the winch motor, and the swivel motor configured to drive the crane device 20 are driven by hydraulic oil discharged from a hydraulic pump (not illustrated) driven by motive power of the engine. The driving force of the engine is transmitted to the hydraulic pump via the power take-off (PTO) mechanism.

In addition, the mobile crane 1 includes a controller 50 configured to control the traveling of the vehicle body 10 and the operation of the crane device 20. The controller 50 functions as a number-of-falls determination unit that calculates information for determining the suitability of the number of falls of the rope 22.

The controller 50 has a CPU, a ROM, a RAM, and the like. In the controller 50, when receiving an input signal from a device connected to the input side, the CPU reads a program stored in the ROM based on the input signal, and stores a state detected by the input signal in the RAM or transmits an output signal to the device connected to the output side.

Figure 2:
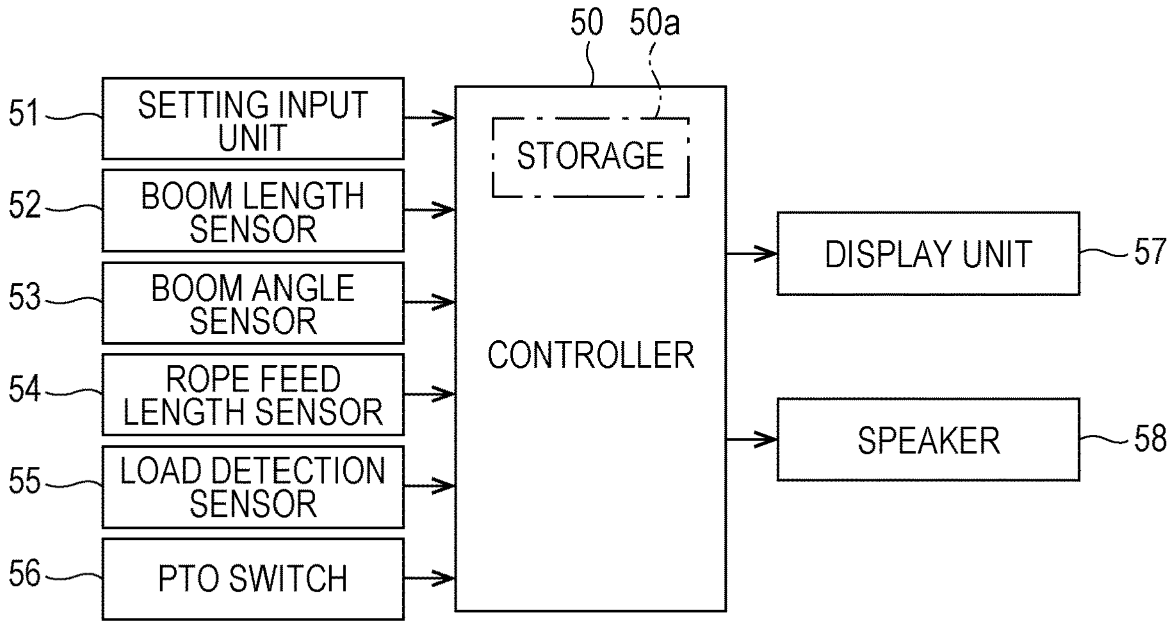
FIG. 2 is a block diagram illustrating a control system.

As illustrated in FIG. 2, a setting input unit 51, a boom length sensor 52, a boom angle sensor 53, a rope feed length sensor 54, a load detection sensor 55, a PTO switch 56, and the like are connected to the input side of the controller 50. The setting input unit 51 is an input device configured for an operator to input settings during the operation of the crane device 20. The boom length sensor 52 is a boom length detection unit configured to detect an elongation/contraction length Lb of the telescoping boom 21. The boom angle sensor 53 is a boom angle detection unit configured to detect a hoist angle 9 of the telescoping boom 21. The rope feed length sensor 54 is a feed length detection unit configured to detect a feed length Lr of the rope 22 fed from the winch drum 23*a*. The load detection sensor 55 is a load detection unit configured to detect a load W, such as baggage, acting on the hook block 24 and the tip of the telescoping boom 21. The PTO switch 56 switches a PTO mechanism between a state where the driving force of the engine is transmitted to the hydraulic pump (on) and a state where the transmission is cut off (off).

As illustrated in FIG. 2, a display unit 57 and a speaker 58 are connected to the output side of the controller 50. The display unit 57 and the speaker 58 function as a notification unit configured to notify the operator in the cab 30 of a state of the crane device 20 including the suitability of the number of falls of the rope 22.

The setting input unit 51 is a touch panel having the function of the display unit 57 and the functions as an input device, such as a liquid crystal panel. The setting input unit 51 is operated by the operator when setting a set number of falls R for the rope 22 wound between the boom head 21*b* of the telescoping boom 21 and the hook block 24. Information on the set number of falls R set by the setting input unit 51 is stored in a storage unit 50*a* of the controller 50.

The boom length sensor 52 is provided, for example, on the proximal side of the telescoping boom 21, and includes: a cord reel in which a tip of a cord to be fed is connected to a boom member on the most distal side; and a rotary encoder connected to a rotation shaft of the cord reel. The boom length sensor 52 acquires the boom length Lb of the telescoping boom 21 based on a detection result of a rotation speed of the rotary encoder.

The boom angle sensor 53 has, for example, a potentiometer attached to a side surface of a boom member on the most proximal side of the telescoping boom 21. The boom angle sensor 53 acquires the hoist angle θ of the telescoping boom 21 based on a detection result of the potentiometer.

The rope feed length sensor 54 has, for example, a rotary encoder configured to detect a rotation speed of the winch drum 23*a* of the winch 23. The rope feed length sensor 54 acquires the feed length Lr of the rope 22 fed from the winch 23 based on a detection result of the rotation speed of the rotary encoder.

The load detection sensor 55 has, for example, a pressure sensor configured to detect the pressure in the raising cylinder 21*a*. The load detection sensor 55 acquires a load acting on the tip of the telescoping boom 21 based on the detected pressure of the pressure sensor.

In the mobile crane 1 configured as described above, a moving speed of the hook block 24 with respect to a winding/feeding speed of the rope 22, a moving amount of the hook block 24 with respect to a winding/feeding amount of the rope 22, and a tensile force of the rope 22 required to lift the hook block 24 and the baggage vary depending on a wound state (the number of falls) of the rope 22 between the boom head 21*b* and the hook block 24.

For example, when the rope 22 extending downward from the top sheave 21*d* is folded back at the hook sheave 24*c* to fix an end to the boom head 21*b*, that is, when the number of falls of the rope 22 is two, the moving speed of the hook block 24 with respect to the winding/feeding speed of the rope 22, the moving amount of the hook block 24 with respect to the winding/feeding amount of the rope 22, and the tensile force of the rope 22 required to lift the hook block 24 and the baggage are halved as compared with those in the case where the number of falls is one.

In addition, when the rope 22 extending downward from the top sheave 21*d* is folded back at the hook sheave 24*c* and the top sheave 21*d* in this order to fix the end to the hook block 24, that is, when the number of falls of the rope 22 is three, each of the moving speed of the hook block 24 with respect to the winding/feeding speed of the rope 22, the moving amount of the hook block 24 with respect to the winding/feeding amount of the rope 22, and the tensile force of the rope 22 required to lift the hook block 24 and the baggage is one-third of that in the case where the number of falls is one.

Figure 3:
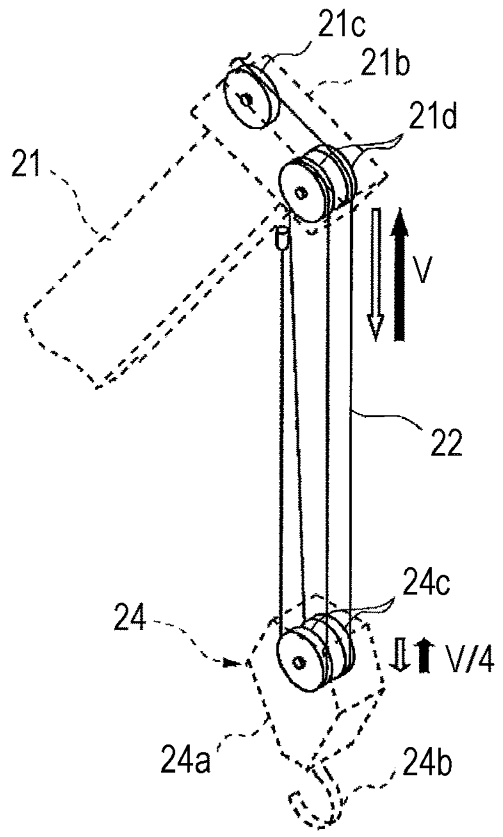
FIG. 3 is a schematic view for describing the number of rope falls between a boom head and a hook block.

In addition, as illustrated in FIG. 3, the rope 22 extending downward from the top sheave 21*d* is folded back at the hook sheave 24*c*, the top sheave 21*d*, and the hook sheave 24*c* in this order to fix the end to the boom head 21*b*, that is, when the number of falls of the rope 22 is four, each of moving speed of the hook block 24 with respect to the winding/feeding speed of the rope 22, the moving amount of the hook block 24 with respect to the winding/feeding amount of the rope 22, and the tensile force of the rope 22 required to lift the hook block 24 and the baggage is one-fourth of that in the case where the number of falls is one.

The operator performs the work of hanging the rope 22 between the boom head 21*b* and the hook block 24 and sets the set number of falls R for the rope 22 via the setting input unit 51 before starting the crane work of the crane device 20. The information on the set number of falls R for the rope 22 input via the setting input unit 51 is stored in the storage unit 50*a* of the controller 50. The controller 50 controls the operation of the telescoping boom 21 based on the set number of falls R for the rope 22 stored in the storage unit 50*a* such that a load exceeding the rated load does not act on the tip of the telescoping boom 21.

In addition, the controller 50 performs a number-of-falls determination process of determining whether the actual number of falls of the rope 22 between the boom head 21*b* and the hook block 24 and the set number of falls R of the rope 22 set by the operator are the same during the operation of the crane device 20 before starting the crane work. This process is realized, for example, by executing a number-of-falls determination program stored in the ROM by the CPU of the controller 50. The operation of the CPU at this time will be described with reference to the flowchart of FIG. 4.

(Step S1)

In step S1, the CPU determines whether the PTO switch 56 is in the on state. The processing is shifted to step S2 if it is determined that the PTO switch 56 is in the ON state, and the number of falls setting determination process is ended if it is not determined that the PTO switch 56 is in the ON state.

(Step S2)

In step S2, the CPU determines whether the crane device 20 is in a predetermined state for starting to integrate the feed length Lr of the rope 22. The processing is shifted to step S3 if it is determined that the crane device 20 is in the predetermined state, and the number-of-falls determination process is ended if it is not determined that the crane device 20 is in the predetermined state.

Here, the predetermined state is, for example, a state where an operation of the crane device 20 other than the raising operation of the telescoping boom 21 or the operation of the winch 23 has been input after an attitude of the hook block 24 is changed from a retracted attitude to a working attitude in the so-called hook-in type crane device 20 in which the hook block 24 is in the retracted attitude at the tip of the telescoping boom 21. In addition, for example, in the crane device 20 in which the vehicle body 10 travels in a state where the hook block 24 is locked to a frame located near the cab 30, the predetermined state is a state where an operation of the crane device 20 other than the raising operation of the telescoping boom 21 or the operation of the winch 23 has been input.

(Step S3)

In step S3, the CPU starts to integrate the feed length Lr of the rope 22 from the winch 23 and shifts the processing to step S4.

(Step S4)

In step S4, the CPU acquires the load W acting on the tip of the telescoping boom 21 by the load detection sensor 55, and determines whether the load W is larger than zero. The processing is shifted to step S5 if it is determined that the load W detected by the load detection sensor 55 is larger than zero, and the process of step S4 is repeated if it is not determined that the load W detected by the load detection sensor 55 is larger than zero.

Here, the case where the load W is larger than zero indicates a state where the hook block 24 is located on an installation surface, such as a state where the hook block 24 moves on the installation surface of the mobile crane 1 by being driven by the winch 23, after setting the actual number of falls of the rope 22 on the installation surface of the mobile crane 1.

(Step S5)

In step S5, the CPU determines whether the load W detected by the load detection sensor 55 is equal to or larger than a weight Wf of the hook block 24. The processing is shifted to step S6 if it is determined that the load W detected by the load detection sensor 55 is equal to or larger than the weight Wf of the hook block 24, and the processing returns to step S4 if it is not determined that the load W detected by the load detection sensor 55 is equal to or larger than the weight Wf of the hook block 24.

Here, the state where the load W detected by the load detection sensor 55 is equal to or larger than the weight Wf of the hook block 24 is a state of hoisting a grounded load where the hook block 24 is lifted from the installation surface of the mobile crane 1. At this time, the hook block 24 can be regarded as being located directly below the boom head 21*b* of the telescoping boom 21 and located slightly above an installation surface of the mobile crane 1.

(Step S6)

In step S6, the CPU acquires the feed length Lr of the rope 22 by the rope feed length sensor 54, and shifts the processing to step S7.

(Step S7)

In step S7, the CPU acquires the elongation/contraction length Lb of the telescoping boom 21 by the boom length sensor 52, and shifts the processing to step S8.

(Step S8) In step S8, the CPU acquires the hoist angle θ of the telescoping boom 21 by the boom angle sensor 53, and shifts the processing to step S9.

(Step S9)

In step S9, the CPU acquires the estimated rope length Le of the rope 22 fed from the tip of the telescoping boom 21, and shifts the processing to step S10.

Figure 5:
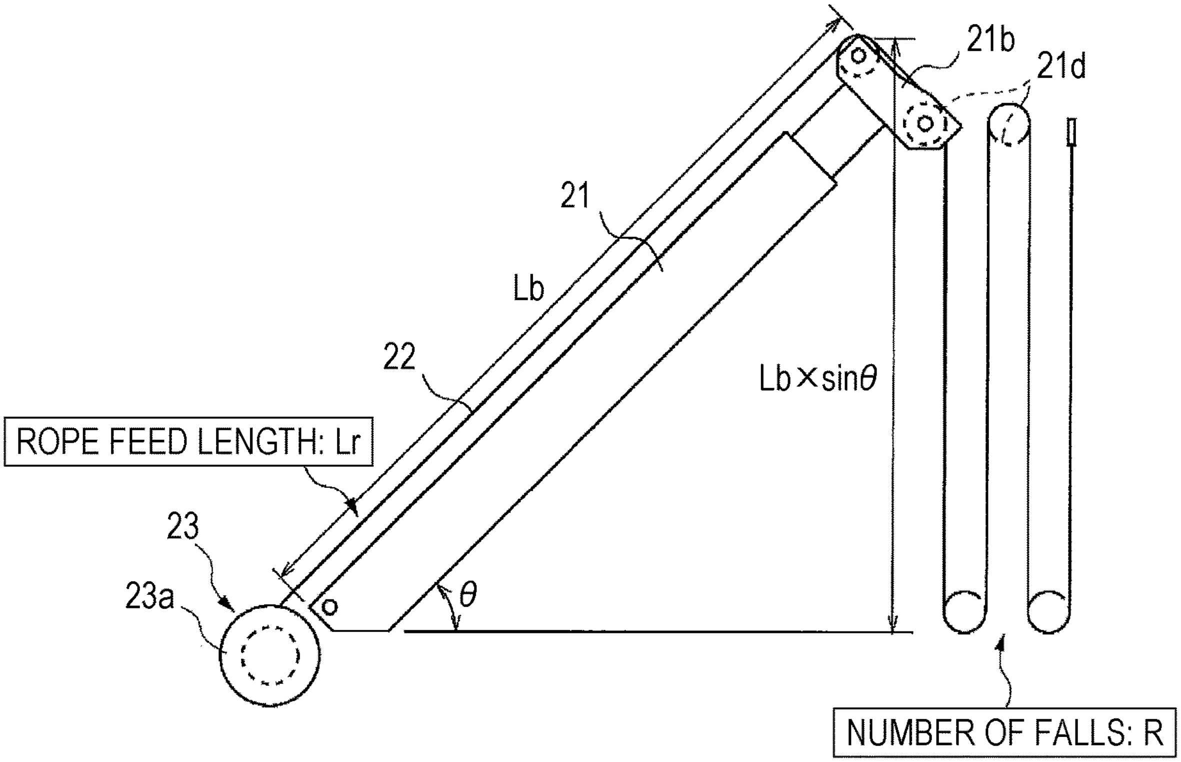
FIG. 5 is a view for describing determination of the number of falls.

As illustrated in FIG. 5, at the time of hoisting the grounded load, the suspended length of the rope 22 from the tip of the telescoping boom 21 to the hook block 24 can be regarded as corresponding to a vertical distance (Lb×sine) between the tip and the proximal end of the telescoping boom 21 calculated based on the elongation/contraction length Lb and the hoist angle θ of the telescoping boom 21. The estimated rope length Le of the rope 22 (=Lb×sin θ×R) is calculated by multiplying the calculated vertical distance (Lb×sin θ) between the tip and the proximal end of the telescoping boom 21 by the set number of falls R set by the operator. However, the estimated rope length Le includes an error corresponding to a height difference ΔL between the proximal end of the telescoping boom 21 and the installation surface of the mobile crane. Note that the estimated rope length Le (=(Lb×sin θ+ΔL)×R) may be calculated in consideration of the difference ΔL. In this case, the estimation accuracy of the estimated rope length Le is improved.

(Step S10)

In step S10, the CPU determines whether the actual rope length (Lr−Lb) of the rope 22 actually fed from the tip of the telescoping boom 21 and the estimated rope length Le of the rope 22 acquired in step S9 are the same. The actual rope length is calculated based on the feed length Lr of the rope 22 acquired in step S6 and the elongation/contraction length Lb of the telescoping boom 21 acquired in step S7. The number-of-falls determination process is ended if it is determined that the actual rope length (Lr−Lb) and the estimated rope length Le are the same, and the processing is shifted to step S11 if it is not determined that the actual rope length (Lr−Lb) and the estimated rope length Le are the same.

Here, it is unnecessary to determine whether the both are exactly the same in the determination on whether the actual rope length (Lr−Lb) and the estimated rope length Le are the same. For example, it is determined that the both are the same if a difference between the actual rope length (Lr−Lb) and the estimated rope length Le falls within a predetermined range. The predetermined range is set to include, for example, the error included in the estimated rope length Le caused by the difference in height between the proximal end of the telescoping boom 21 and the installation surface of the mobile crane 1.

(Step S11)

In step S11, the CPU displays the fact that the set number of falls R set by the operator and the actual number of falls are not the same on the display unit 57, and outputs the fact as a voice through the speaker 58, and ends the number-of-falls determination process.

As described above, the crane device 20 according to the present embodiment is the crane device, capable of setting multiple types of number of falls for the rope 22 between the tip of the telescoping boom 21 and the hook block 24, and includes: the rope feed length sensor 54 (feed length detection unit) that detects the feed length Lr of the rope 22 fed from the winch 23 on which the rope 22 is wound; the boom angle sensor 53 (boom angle detection unit) that detects the hoist angle θ of the telescoping boom 21; and the controller 50 (number-of-falls determination unit) that calculates information for determining the suitability of the number of falls of the rope 22 on the basis of the feed length Lr, the hoist angle θ, and the elongation/contraction length Lb of the telescoping boom 21 in the state of hoisting the grounded load.

Specifically, in the crane device 20, the controller 50 calculates the actual rope length (Lr−Lb) based on the feed length Lr of the rope 22 fed from the winch 23 and the elongation/contraction length Lb of the telescoping boom 21. In addition, the controller 50 calculates the estimated rope length (Lb×sin θ×R) based on the vertical distance (Lb×sin θ) between the tip and the proximal end of the telescoping boom 21 calculated based on the hoist angle θ of the telescoping boom 21 and the elongation/contraction length Lb and the set number of falls R for the rope 22 stored in the storage unit 50*a*. Then, the controller 50 determines whether the actual number of falls of the rope 22 hung between the tip of the telescoping boom 21 and the hook block 24 and the set number of falls R for the rope 22 stored in the storage unit 50*a* are the same based on the actual rope length (Lr−Lb) and the estimated rope length (Lb×sin θ×R).

Figure 4:
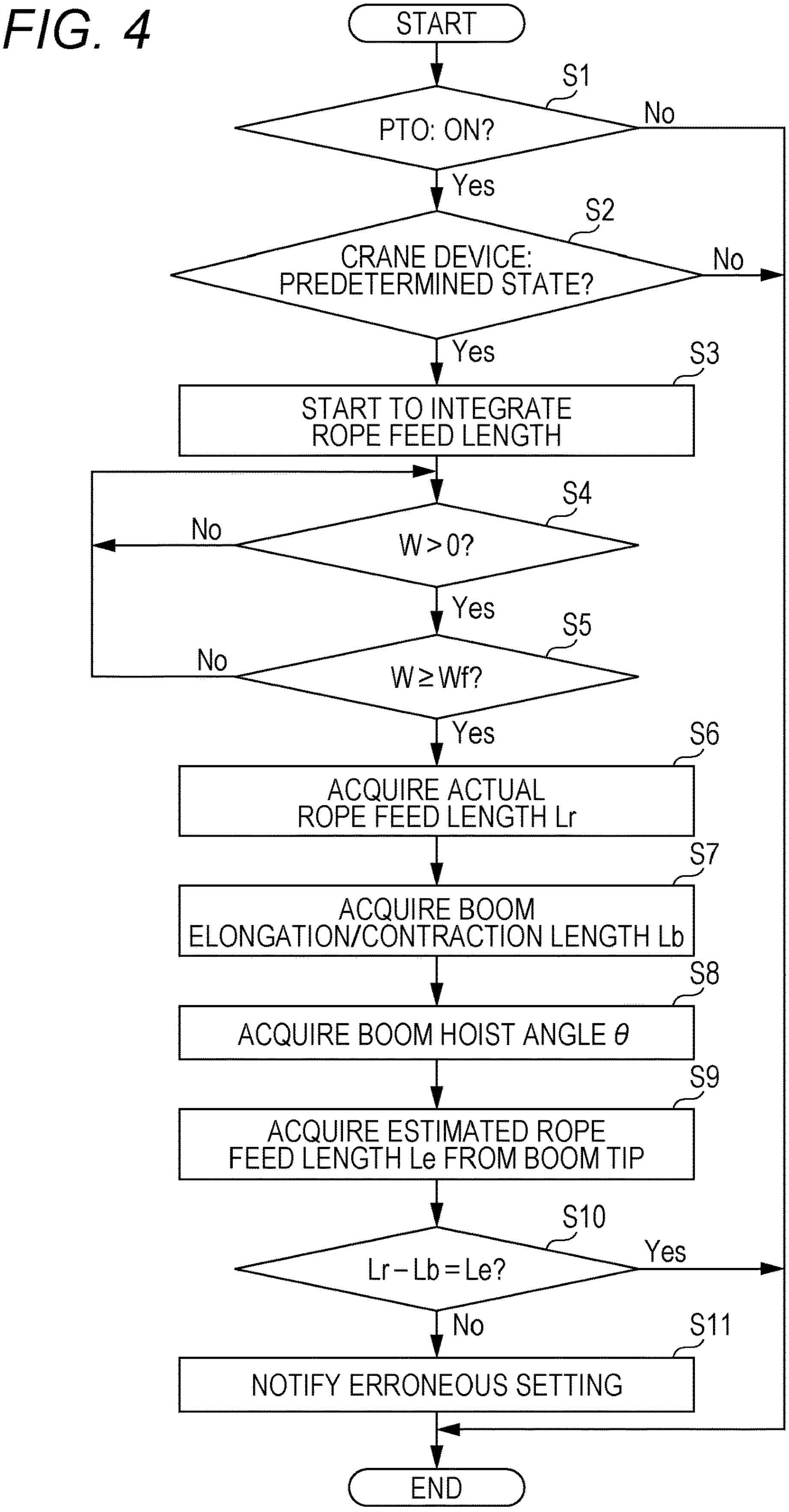
FIG. 4 is a flowchart illustrating a number-of-falls determination process.

In addition, the method for determining the number of falls according to the embodiment is the method for determining the number of falls for the rope 22 in the crane device 20, capable of setting multiple types of number of falls of the rope 22 between the tip of the telescoping boom 21 and the hook block 24, and includes: a step of acquiring the feed length Lr of the rope 22 fed from the winch 23 on which the rope 22 is wound (step S6 in FIG. 4); a step of acquiring the hoist angle θ of the telescoping boom 21 (step S8 in FIG. 4); a step of acquiring the elongation/contraction length Lb (boom length) of the telescoping boom 21 (step S7 in FIG. 4); and a step of calculating information for determining the suitability of the number of falls of the rope 22 based on the feed length Lr, the hoist angle θ, and the elongation/contraction length Lb in the state of hoisting the grounded load (steps S9 and S10 in FIG. 4).

In addition, in the embodiment, the crane device according to the present invention is realized as the CPU executes the number-of-falls determination program stored in the ROM.

That is, the program according to the embodiment causes the CPU (computer) of the crane device 20, capable of setting multiple types of number of falls of the rope 22 between the tip of the telescoping boom 21 and the hook block 24, to execute: a process of acquiring the feed length Lr of the rope 22 fed from the winch 23 on which the rope

22 is wound (step S6 in FIG. 4); a process of acquiring the hoist angle θ of the telescoping boom 21 (step S8 in FIG. 4); a process of acquiring the elongation/contraction length Lb (boom length) of the telescoping boom 21 (step S7 in FIG. 4); and a process of calculating information for determining the suitability of the number of falls of the rope 22 based on the feed length Lr, the hoist angle θ, and the elongation/contraction length Lb in the state of hoisting the grounded load (steps S9 and S10 in FIG. 4).

The number-of-falls determination program can be provided, for example, via a computer-readable portable storage medium (including, for example, an optical disk, a magneto-optical disk, and a memory card) in which the program has been stored. In addition, for example, the number-of-falls determination program can be provided by being downloaded from a server that owns the program via a network.

As a result, it is possible to determine whether the actual number of falls of the rope 22 and the set number of falls R for the rope 22 stored in the number-of-falls storage unit are the same with the device provided in the conventional crane device, and thus, it is possible to suppress the increase in manufacturing cost of the crane device 20.

In addition, the controller 50 determines that the state of hoisting the grounded load is formed when the load equal to or larger than the weight Wf of the hook block 24 is detected by the load detection sensor 55, and determines whether the actual number of falls of the rope 22 and the set number of falls R for the rope 22 stored in the storage unit 50*a* are the same.

As a result, the determination on whether the actual number of falls of the rope 22 and the set number of falls R for the rope 22 stored in the storage unit 50*a* are the same is performed when the hook block 24 is suspended by the telescoping boom 21 during a normal operation of the crane device 20 after changing the number of falls, that is, at the state of hoisting the grounded load of hook block 24. Thus, it is possible to prevent a decrease in work efficiency in the crane work.

In addition, when the actual number of falls of the rope 22 and the set number of falls R for the rope 22 stored in the storage unit 50*a* are not the same, this state is notified by the display unit 57 and the speaker 58.

As a result, it is possible to urge the operator to stop the crane work when the actual number of falls of the rope 22 and the set number of falls R for the rope 22 stored in the storage unit 50*a* are not the same, and thus, it is possible to improve the safety during the crane work.

Note that the crane device 20 having the telescoping boom 21 that is elongatable and contractible is illustrated in the embodiment, but the present invention can be applied to a crane device having a boom having a fixed length without being limited thereto. In this case, the actual rope length (Lr−Lb) and the estimated rope length (Lb×sin θ×R) are calculated with the boom length Lb as a constant.

In addition, the acquisition of the feed length Lr of the rope 22 (step S6), the acquisition of the elongation/contraction length Lb of the telescoping boom 21 (step S7), and the acquisition of the hoist angle θ of the telescoping boom 21 (step S8) are performed in this order in the number-of-falls determination process in the embodiment, but the present invention is not limited thereto. In the number-of-falls determination process, the order of the acquisition of the feed length Lr of the rope 22, the acquisition of the elongation/contraction length Lb of the telescoping boom 21, and the acquisition of the hoist angle θ of the telescoping boom 21 may be interchanged. In addition, the feed length Lr of the rope 22 may be acquired after the acquisition of the estimated rope length Le.

In addition, when the actual number of falls of the rope 22 and the set number of falls R are not the same, the operator is notified of this fact through the display unit 57 and the speaker 58 in the embodiment, but one of the display unit 57 and the speaker 58 may be used for the notification. In addition, the operation of the crane device 20 may be restricted when the actual number of falls of the rope 22 and the set number of falls R are not the same.

In addition, the suitability of the number of falls of the rope 22 is determined based on whether the actual rope length (Lr−Lb) and the estimated rope length Le are the same in the embodiment. However, the suitability of the number of falls may be determined by estimating the number of falls of the rope 22 based on the suspended length (Lb×sin θ) of the rope 22 and the actual rope length (Lr−Lb) of the rope 22, and comparing the set number of falls R with the estimated number of falls.

In addition, information (for example, the actual rope length (Lr−Lb) and the estimated rope length Le, or the estimated number of falls) for determining the suitability of the number of falls of the rope 22 may be calculated and provided to the operator, and the operator may determine the suitability of the number of falls.

It should be considered that the embodiment disclosed herein is illustrative and is not restrictive in all respects. The scope of the present invention is illustrated not by the above description but by the scope of claims, and is intended to include all modifications within the meaning and scope equivalent to the scope of claims.

REFERENCE SIGNS LIST

1 mobile crane
20 crane device
21 telescoping boom
22 rope
23 winch
24 hook block
50 controller
50*a* storage unit
51 setting input unit
52 boom length sensor (boom length detection unit)
53 boom angle sensor (boom angle detection unit)
54 rope feed length sensor (feed length detection unit)
55 load detection sensor (load detection unit)
57 display unit (notification unit)
58 speaker (notification unit)

The invention claimed is:

1. A crane device, capable of setting multiple types of number of rope falls between a tip of a boom and a hook block, comprising:

a feed length detection sensor configured to detect a feed length of a rope fed from a winch on which the rope is wound;

a boom angle detection sensor configured to detect a hoist angle of the boom;

a boom length detection sensor configured to detect a boom length of the boom; and a processor with a memory, wherein the memory stores a set number of falls for the rope set by an operator, and wherein the processor:

acquires the feed length, the hoist angle, and the boom length in a state of hoisting a grounded load, from the feed length detection sensor, the boom angle detection sensor, and the boom length detection sensor;

calculates an actual rope length of the rope fed from the tip of the boom based on the feed length and the boom length;

calculates a suspended length of the rope corresponding to a vertical distance between the tip and a proximal end of the boom based on the hoist angle and the boom length;

calculates an estimated rope length of the rope fed from the tip of the boom based on the suspended length and the set number of falls; and determines suitability of a number of falls for the rope based on the actual rope length and the estimated rope length.

2. The crane device according to claim 1, wherein the boom is configured to be elongatable and contractible.

3. The crane device according to claim 1, further comprising a load detection sensor configured to detect a load acting on the tip of the boom, wherein the state of hoisting the grounded load is determined to be formed when the load detection sensor detects a load equal to or larger than a weight of a hook block.

4. The crane device according to claim 1, wherein the processor notifies the suitability of the number of falls for the rope.

5. A method for determining a number of falls for a rope in a crane device, capable of setting multiple types of number of falls of the rope between a tip of a boom and a hook block, the method comprising:

storing a set number of falls for the rope set by an operator;

acquiring a feed length of the rope fed from a winch on which the rope is wound in a state of hoisting a grounded load;

acquiring a hoist angle of the boom in the state of hoisting the grounded load;

acquiring a boom length of the boom in the state of hoisting the grounded load;

calculating an actual rope length of the rope fed from the tip of the boom based on the feed length and the boom length;

calculating a suspended length of the rope corresponding to a vertical distance between the tip and a proximal end of the boom based on the hoist angle and the boom length;

calculating an estimated rope length of the rope fed from the tip of the boom based on the suspended length and the set number of falls; and determining suitability of a number of falls for the rope based on the actual rope length and the estimated rope length.

6. A computer readable non-transitory recording medium storing a program causing a computer of a crane device, capable of setting multiple types of number of falls of a rope between a tip of a boom and a hook block, to execute predetermined processing, the predetermined processing comprising:

storing a set number of falls for the rope set by an operator;

acquiring a feed length of the rope fed from a winch on which the rope is wound in a state of hoisting a grounded load;

acquiring a hoist angle of the boom in the state of hoisting the grounded load;

acquiring a boom length of the boom in the state of hoisting the grounded load;

calculating an actual rope length of the rope fed from the tip of the boom based on the feed length and the boom length;

calculating a suspended length of the rope corresponding to a vertical distance between the tip and a proximal end of the boom based on the hoist angle and the boom length;

calculating an estimated rope length of the rope fed from the tip of the boom based on the suspended length and the set number of falls; and determining suitability of a number of falls for the rope based on the actual rope length and the estimated rope length.

* * * * *